US007103954B2

(12) United States Patent
Krish, Sr. et al.

(10) Patent No.: US 7,103,954 B2
(45) Date of Patent: Sep. 12, 2006

(54) STAMPED GATE BAR FOR VENDING MACHINE AND METHOD OF FORMING SAME

(75) Inventors: Joseph J. Krish, Sr., Richfield, OH (US); William R. Reis, Grafton, OH (US); Donald R. Mikuluk, Lakewood, OH (US)

(73) Assignee: The Boehm Pressed Steel Company, Valley City, OH (US)

( * ) Notice: Subject to any disclaimer, the term of this patent is extended or adjusted under 35 U.S.C. 154(b) by 364 days.

(21) Appl. No.: 10/449,151

(22) Filed: May 30, 2003

(65) Prior Publication Data

US 2004/0238560 A1 Dec. 2, 2004

(51) Int. Cl.
*B23P 17/00* (2006.01)
*B21D 39/00* (2006.01)

(52) U.S. Cl. .......................................... 29/412; 29/521

(58) Field of Classification Search .................. 29/412, 29/413, 414, 417, 418, 521, 897, 897.33
See application file for complete search history.

(56) References Cited

U.S. PATENT DOCUMENTS 2,580,282 A * 12/1951 Colley ......................... 449/37
3,883,038 A * 5/1975 Bookout ...................... 221/67
3,884,330 A * 5/1975 Chalabian .................. 194/233
4,198,083 A * 4/1980 Fessler ....................... 292/205
4,460,107 A 7/1984 Lindsey
5,392,953 A 2/1995 Maldanis et al.
5,799,823 A 9/1998 Feltrin
5,806,712 A 9/1998 Siemsen et al.
6,047,511 A * 4/2000 Lehane et al. ........... 52/506.07
6,321,936 B1 11/2001 Feltrin
6,886,232 B1 * 5/2005 Kessler ........................ 29/412
2004/0104239 A1 * 6/2004 Black et al. ................ 221/124

* cited by examiner

*Primary Examiner*—David P. Bryant
(74) *Attorney, Agent, or Firm*—Fay, Sharpe, Fagan, Minnich & McKee, LLP

(57) ABSTRACT

A stamped gate bar for a vending machine having an elongated body with opposing ends. The elongated body is formed first and second side walls extending from an integrally formed edge wall. A support member is disposed along at least one of the opposing ends, and an actuation member is also disposed along at least one of the opposing ends. A method of forming the gate bar from a sheet of metal is also disclosed.

20 Claims, 32 Drawing Sheets

STAMPED GATE BAR FOR VENDING MACHINE AND METHOD OF FORMING SAME

This invention relates to the art of vending machines and, more particularly, to a gate bar for use in a vending machine that is formed or stamped from a sheet of metal.

BACKGROUND OF THE INVENTION

Vending machines, including those adapted to dispense beverage containers, such as cans and plastic bottles, for example, are well known and widely used. Generally, the various components of vending machines and the principles of operation of such components in acting to vend or otherwise dispense beverage containers or other products are well understood. The present invention finds particular application in certain components of vending machines, and is described herein with particular reference to one commonly used component. However, it is to be distinctly understood that the principles of the present invention are equally applicable to other suitable components used in vending machines, and that such other components are specifically intended to come within the scope of the present invention.

One example of a suitable vending machine component is known as a gate bar or load bar. In the interests of clarity and ease of reading, the term gate bar will be used throughout this application to refer to this component. However, it will be appreciated that other terms are often used.

A gate bar is typically used to support one or more columns of un-vended beverage containers and/or other products above a bucket or other device that dispenses the product as a part of the actual vend operation. The bucket is adapted to house a small quantity of beverage containers or other products, such as three or four beverage cans, for example. The bucket operates to dispense the beverage containers housed therein one at a time during vend operations until no beverage containers remain in the bucket. The gate bar is then actuated to replenish the quantity of products in the bucket by allowing a suitable number of products to drop into the bucket from the columns of products supported thereabove by the gate bar.

Given the trends toward larger vending machines suitable for dispensing oversized plastic bottles, and the desire to reduce maintenance, i.e., restocking vending machines, for example, it is typical for a vending machine to have a large quantity of un-vended beverage containers and/or other products in each vending envelope of the vending machine that are stacked on and supported by a gate bar. Such a quantity of products imposes a considerable load that is, in many cases, entirely supported by the gate bar. As such, gate bars are typically sufficiently rigid, in both torsion and bending, to support the full load without undue deflection. For this and other reasons, gate bars are commonly constructed from metal, such as zinc or aluminum. Gate bars made of zinc are typically die cast, while gate bars manufactured from aluminum can be extruded and then machined, or even machined entirely from bar stock.

There are number of disadvantages and shortcomings associated with gate bars of the above-discussed constructions. One notable disadvantage is, quite simply, cost. It will be appreciated that many thousands of vending machines for beverage containers and other products are manufactured world wide each year, and such vending machines each commonly have five or more gate bars supported therein. As such, gate bars represent a significant expense associated with the manufacture of such vending machines. As a result, it is desirable to develop a gate bar that has sufficient rigidity and strength for the vending application, yet which is less costly to manufacture.

Initially, the gate bar is stationed in a first position in which the beverage containers or other products are supported within the vending envelope of the machine. During a vend operation, the gate bar is displaced into a second position in which the beverage containers or other products are allowed to drop through the envelope into the bucket supported therebelow. However, the gate bar is quickly cycled back to the first position allowing only one row of products to pass into the bucket. As such, there is typically minimal clearance within the vending envelope to reduce the distance the gate bar travels between the first and second positions. Additionally, the gate bar commonly has a minimal amount of mass. This reduces the size and power requirements of the actuator that cycles the gate bar between the first and second positions. As such, it is desirable to develop a gate bar having a minimal cross-sectional profile and a minimal mass, yet which retains sufficient rigidity to meet the operational parameters of vending machine applications.

SUMMARY OF THE INVENTION

In accordance with the present invention, a stamped gate bar for a vending machine is provided that avoids or minimizes the problems and disadvantages encountered in connection with gate bars of the foregoing character while promoting a desired simplicity of structure and economy of manufacture.

More particularly in this respect, a stamped gate bar is provided that includes an elongated body having opposing ends and formed from first and second side walls that extend from an integrally formed edge wall. A support member is disposed at one of the opposing ends. Additionally, an actuator member is disposed at one of the opposing ends.

Furthermore, a stamped gate bar is provided for use in a vending machine that has an actuator and a pair of supports that are disposed in spaced relation to one another. The stamped gate bar includes an elongated body that has opposing ends. The body is formed from opposing side walls that extend substantially parallel to one another from a common edge wall. The gate bar also includes a pair of support members each of which is disposed along a different one of the ends of the body. Each of the support members is operatively associated with a different one of the supports of the vending machines. An actuator member is disposed along one of the ends of the elongated body and is operatively associated with the actuator of the vending machine.

Furthermore, a method of forming a gate bar from a sheet of metal is provided that includes the step of forming a blank on the sheet of metal. The blank includes an elongated body having first side wall portion, a second side wall portion and an edge wall portion disposed between the side wall portions. Another step includes forming the edge wall portion such that at least a part of each of the first and second side wall portions are in abutting engagement with one another. Another step includes attaching the abutting parts of the first and second side wall portions together.

DETAILED DESCRIPTION OF THE INVENTION

Figure 1:
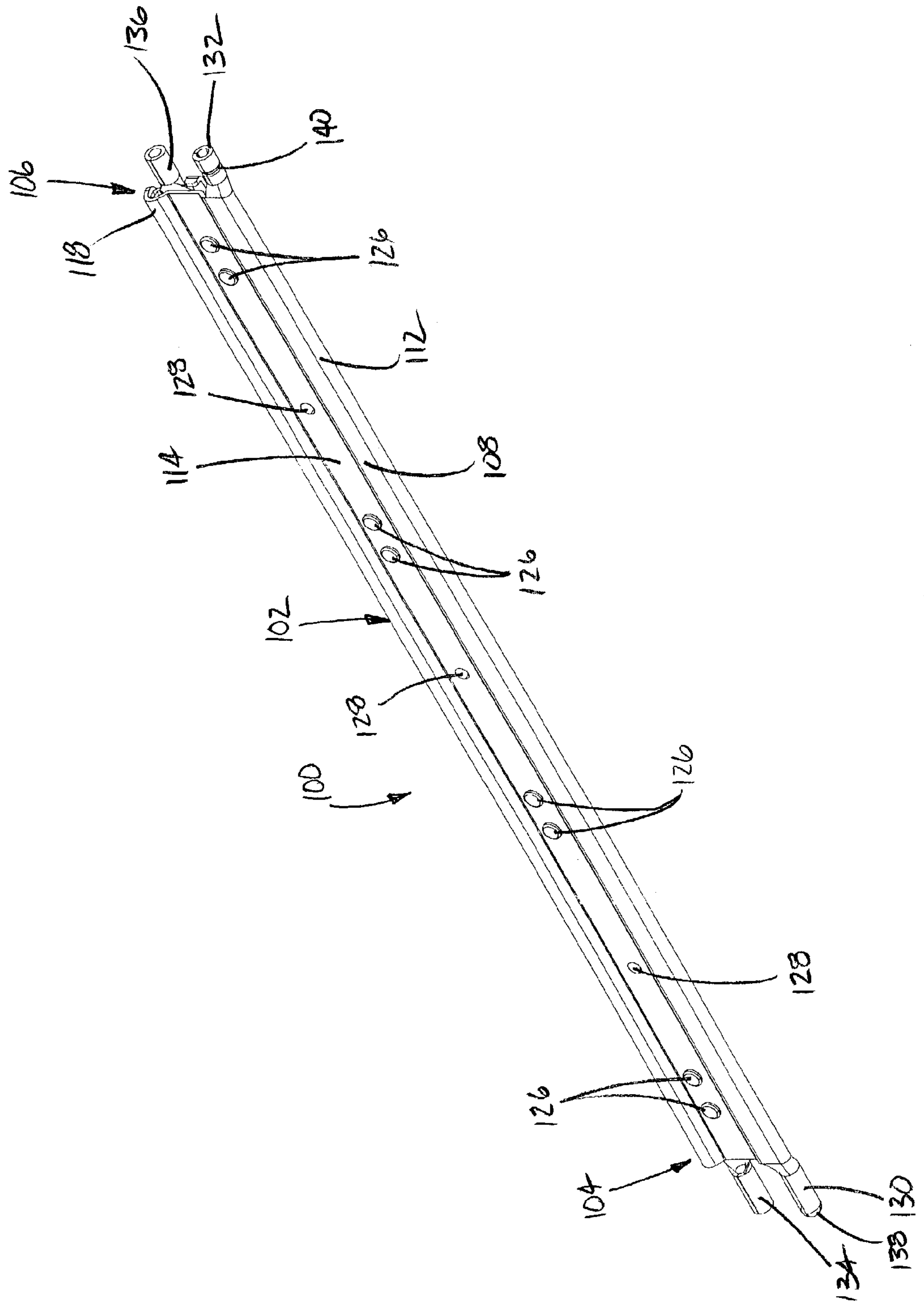
FIG. 1 is a perspective view of a stamped gate bar in accordance with the present invention.
Figure 2:
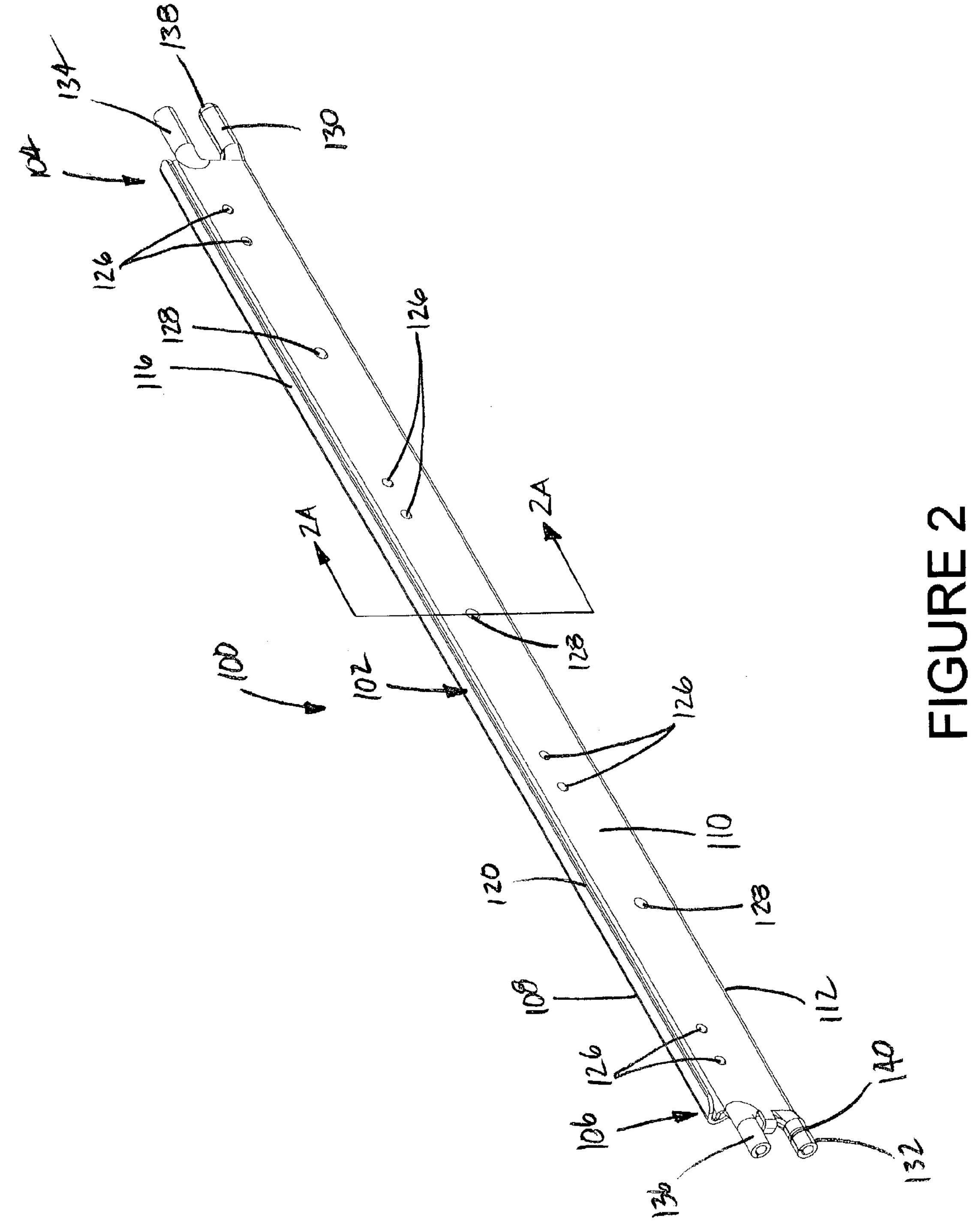
FIG. 2 is another perspective view of the stamped gate bar shown in FIG. 1.
Figure 2A:
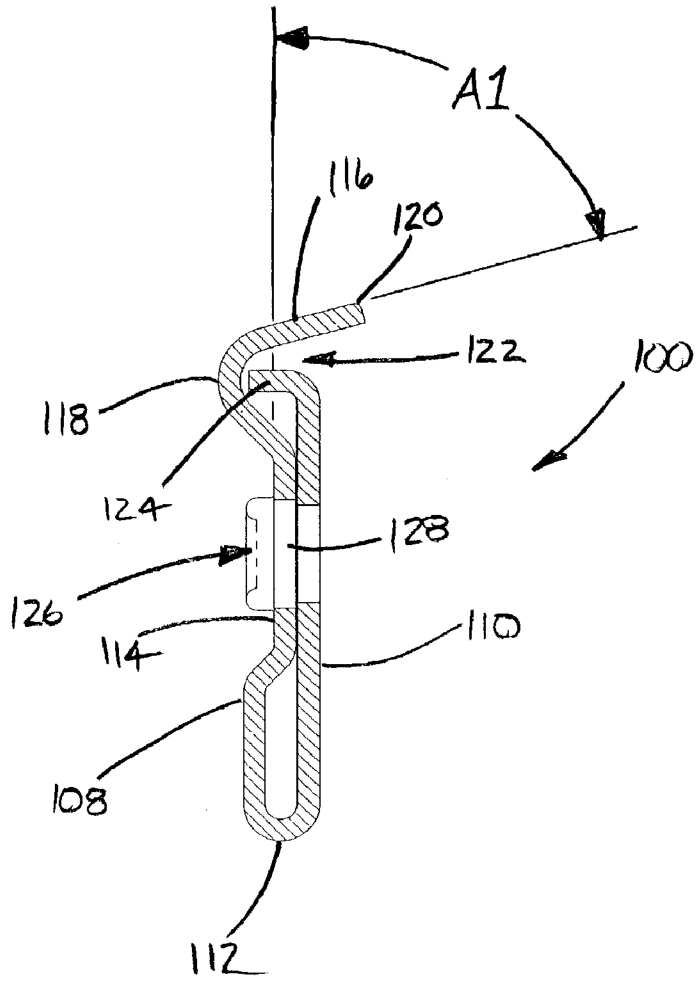
FIG. 2A is a side elevation view, shown in cross section, of the stamped gate bar shown in FIG. 2 taken along line 2A—2A.

Referring now in greater detail to the drawings, wherein the showings are for the purpose of illustrating preferred embodiments of the invention only, and not for the purpose of limiting the invention, FIGS. 1, 2 and 2A illustrate a gate bar 100 having an elongated body 102 and opposing ends 104 and 106. It will be appreciated that gate bars and other similar elongated members commonly take various forms, shapes, sizes, lengths and/or configurations as dictated by the operation of the same within a vending machine. All such variations are distinctly intended to be included within the scope and intent of the present invention, and it is to be particularly understood that the embodiments shown and described herein are simply illustrative of one suitable embodiment in accordance with the present invention.

As shown in FIGS. 1, 2 and 2A, elongated body 102 includes a first side wall 108 and a second side wall 110. Preferably, side walls 108 and 110 are formed from a unitary sheet of material and are integrally connected by an edge wall 112. The edge wall is shown as being generally U-shaped. However, it will be appreciated that any suitable shape, form and/or configuration can be used. First side wall 108 includes an offset portion 114, a vending portion 116 that extends generally transverse to offset portion 114, and a curvilinear portion 118 integrally connecting the offset and vending portions. Vending portion 116 includes an elongated vending edge 120 that is preferably rounded, chamfered or otherwise smoothed or beveled edge to minimize damage to vended products that might come in contact with the vending edge. Vending portion 116 extends at an angle Al to offset portion 114. Angle A1 is shown in FIG. 2A as being about 75 degrees. However, any suitable angle can be used without departing from the principles of the present invention. Curvilinear portion 118 of first side wall 108 forms a longitudinally extending channel 122. Second side wall 110 includes an end wall portion 124 opposite edge wall 112. End wall portion 124 extends generally transverse second side wall 110 into channel 122 formed by portion 118 of first side wall 108.

It will be appreciated from FIG. 2A that offset portion 114 of first side wall 108 and second side wall 110 are in abutting engagement with one another. The offset portion and second side wall are secured to one another using a suitable manner of joining or attachment including fastening, such as by rivets, screws or bolts, for example, and/or joining such as by welding, for example. In one preferred embodiment, the offset portion and second side wall are attached to one another by using an upset-pressing style fastener. One such fastener that is suitable for the present application is sold under the designation or trademark TOX by TOX Pressotechnik GmbH and Co. KG of Weingarten, Germany. TOX joints 126 are shown in FIGS. 1 and 2 and in four groups of two spaced along the length of body 102. It will be appreciated, however, that any suitable number of TOX joints and/or other fasteners or fastening or joining arrangements can be used without departing from the principles of the present invention. Additionally, three optional passages 128 are shown extending through elongated body 102 in spaced relation to one another. If such passages are provided, the same can be of any suitable size, shape, arrangement or other configuration.

Support members 130 and 132 respectively extend from ends 104 and 106 of elongated body 102. Additionally, actuation members 134 and 136 similarly extend from ends 104 and 106, respectively, and are shown in FIGS. 1 and 2 extending substantially parallel with support members 130 and 132. Support members 130 and 132 and actuation members 134 and 136 are shown in the present embodiment as being substantially cylindrical posts or pins suitable for pivotally engaging corresponding features on a vending machine so that the gate bar is displaceable within the vending machine. It will be appreciated, however, that any suitable form or arrangement of features can be used. For example, one or more of the support and actuation members could optionally form a cylindrical passage suitable for receiving a corresponding pin on the vending machine. Additionally, it will be appreciated that any suitable number or form of support members and actuation members can be used. For example, another, different embodiment may include only one actuation member or only one support member as may be suitable for the associated vending machine. Additionally, support member 130 includes an optional bullet-nose end 138. Furthermore, an optional snap ring groove 140 is provided on support member 132. It will be appreciated that such features can likewise be optionally included in any suitable manner or arrangement on any of the other support and/or actuation members.

FIGS. 3–22 illustrate various steps, operations and/or other processes that can be utilized to form a stamped gate bar in accordance with the present invention. Various areas, details and/or features of the gate bar are formed, in whole or in part, in one or more of the steps. As such, the discussion of FIGS. 3–22 hereinafter will typically make reference to those features or characteristics being created or modified by the step or process under discussion. It will be appreciated that various intermediate forms of the finished features may be produced in certain steps of the forming process, and that such intermediate forming steps are intended to be optionally included within the scope and intent of the present invention.

Figure 3:
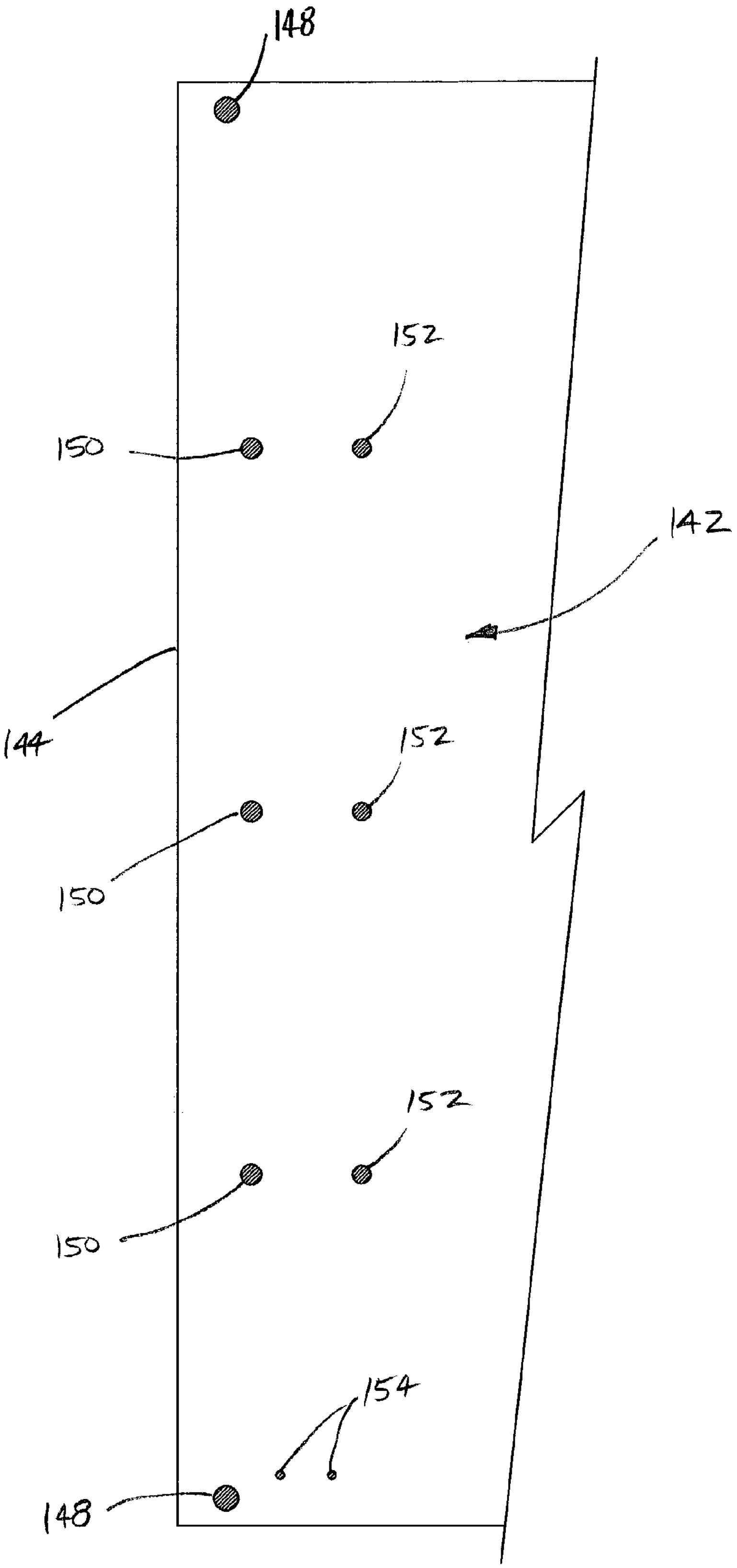
FIG. 3 is a top plan view of a sheet of metal illustrating one step in forming the stamped gate bar shown in FIG. 1.

FIG. 3 shows a strip or sheet of material 142 having a leading edge 144 that is progressively moved through a die set or other suitable arrangement (not shown) for forming a stamped gate bar in accordance with the present invention. Initially, steps or operations, such as those shown in FIGS. 3–7, are used to form a gate bar blank 146 (FIG. 7) from the sheet of material. The gate bar blanks move progressively through the die arrangement (not shown) to form a stamped gate bar in accordance with the present invention. At a first stage, shown in FIG. 3, a plurality of passages, such as holes 148, 150, 152 and 154 are formed in sheet 142. Preferably, these holes are formed by a stamping-type operation. However, other methods of removing material can be used, such as laser cutting, for example. In a next step, shown in FIG. 4, slot areas 156 are similarly removed from sheet 142. It will be appreciated that holes 148, 150, 152 and 154 have advanced to the second stage in which slot areas 156 are formed, while holes 148', 150', 152' and 154' are simultaneously formed at the previous step, as shown in and described with regard to FIG. 3.

Figure 4:
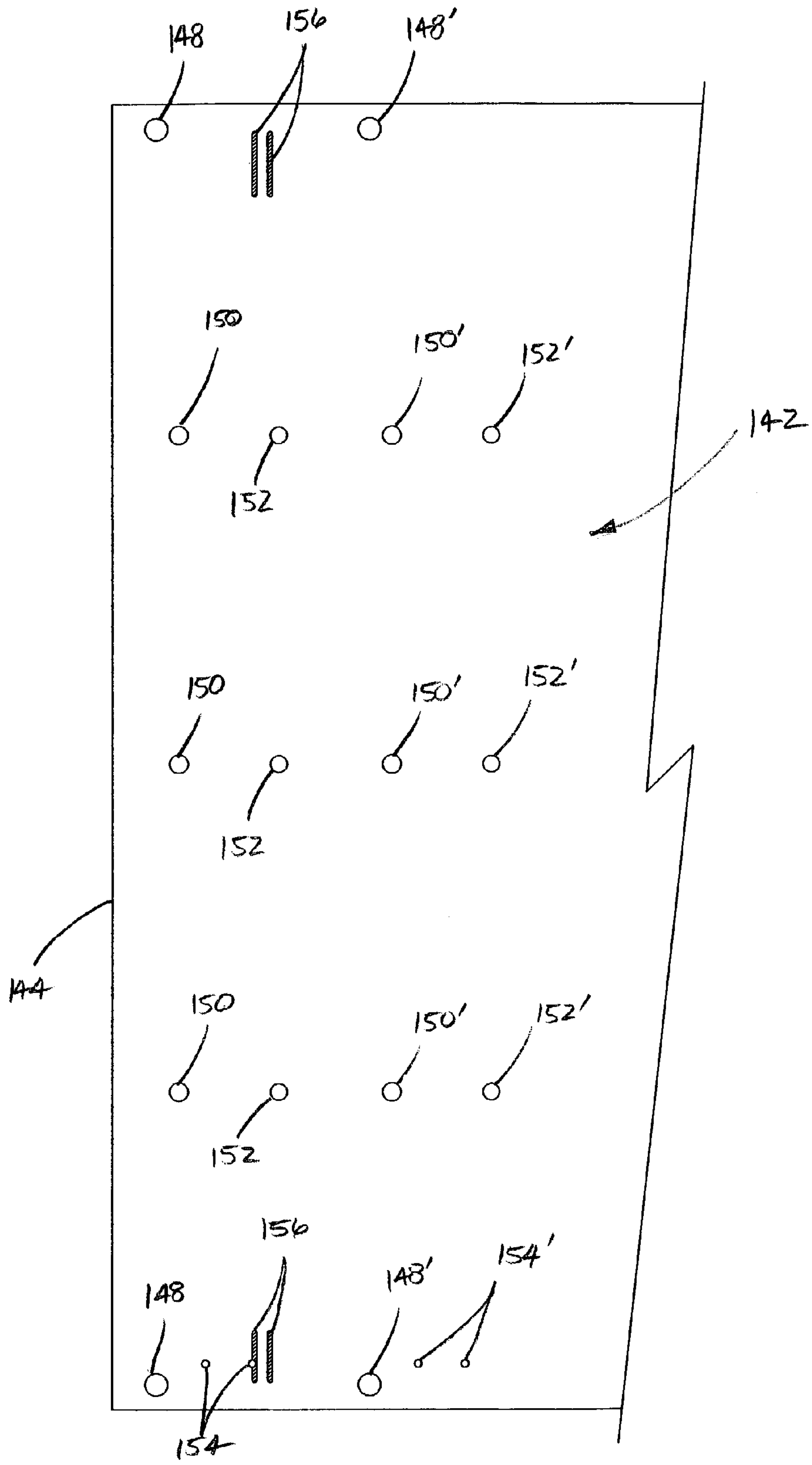
FIG. 4 is a top plan view of the sheet of metal shown in FIG. 3 illustrating another step in forming the stamped gate bar shown in FIG. 1.
Figure 5:
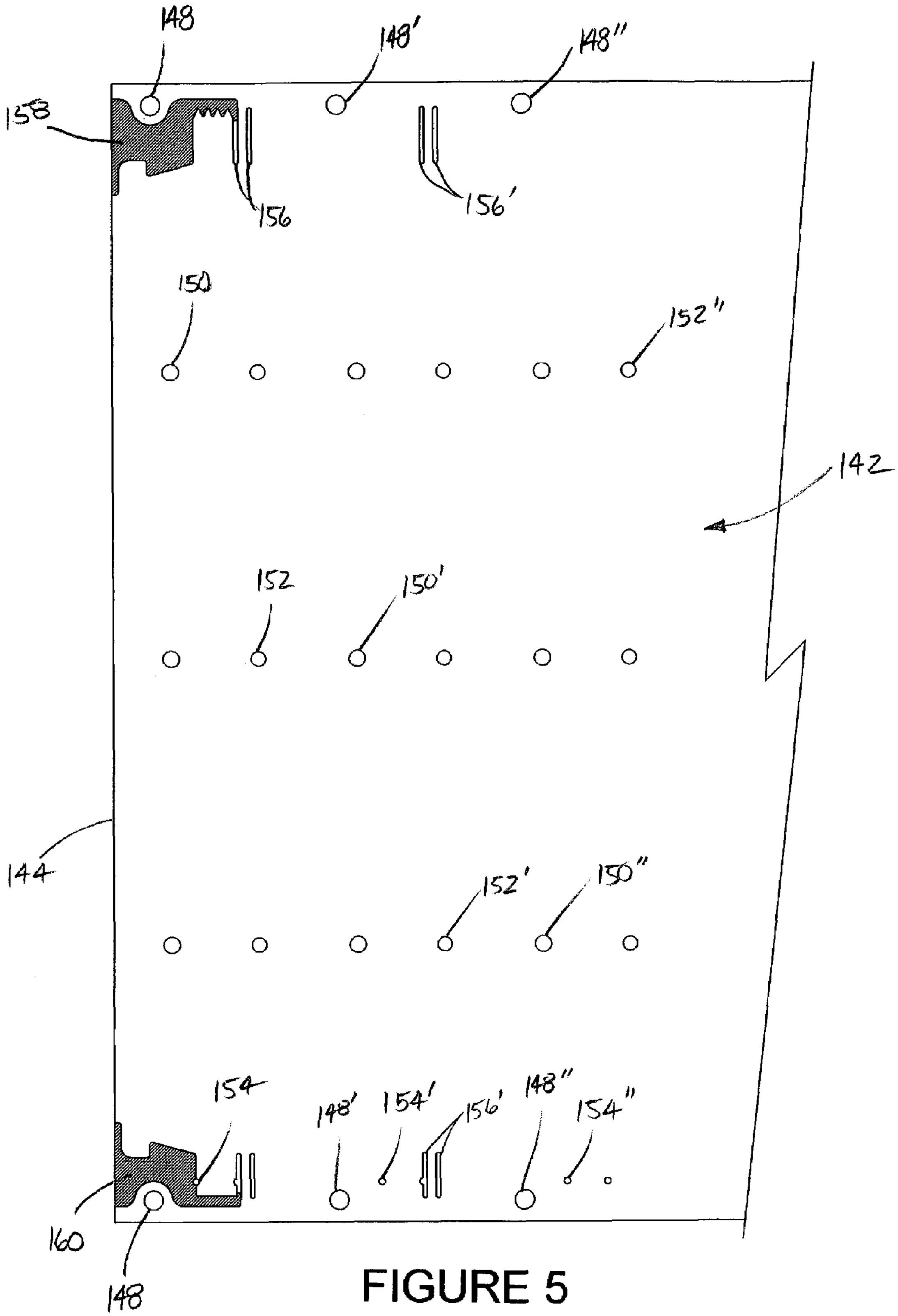
FIG. 5 is a top plan view of the sheet of metal shown in FIG. 4 illustrating another step in forming the stamped gate bar shown in FIG. 1.

Turning now to FIG. 5, areas 158 and 160 are removed from sheet 142 in another step. It will be appreciated that holes 148, 150, 152 and 154 as well as slot areas 156 are positioned adjacent areas 158 and 160 at this stage. It will also be appreciated that slot areas 156' are simultaneously formed upstream as shown in FIG. 4. It will be further appreciated that holes 148", 150", 152" and 154" are simultaneously formed upstream as shown in FIG. 3. Holes 148', 150', 152' and 154' having been previously formed are stationed at the stage shown in FIG. 4 forming slot areas 156'.

Figure 6:
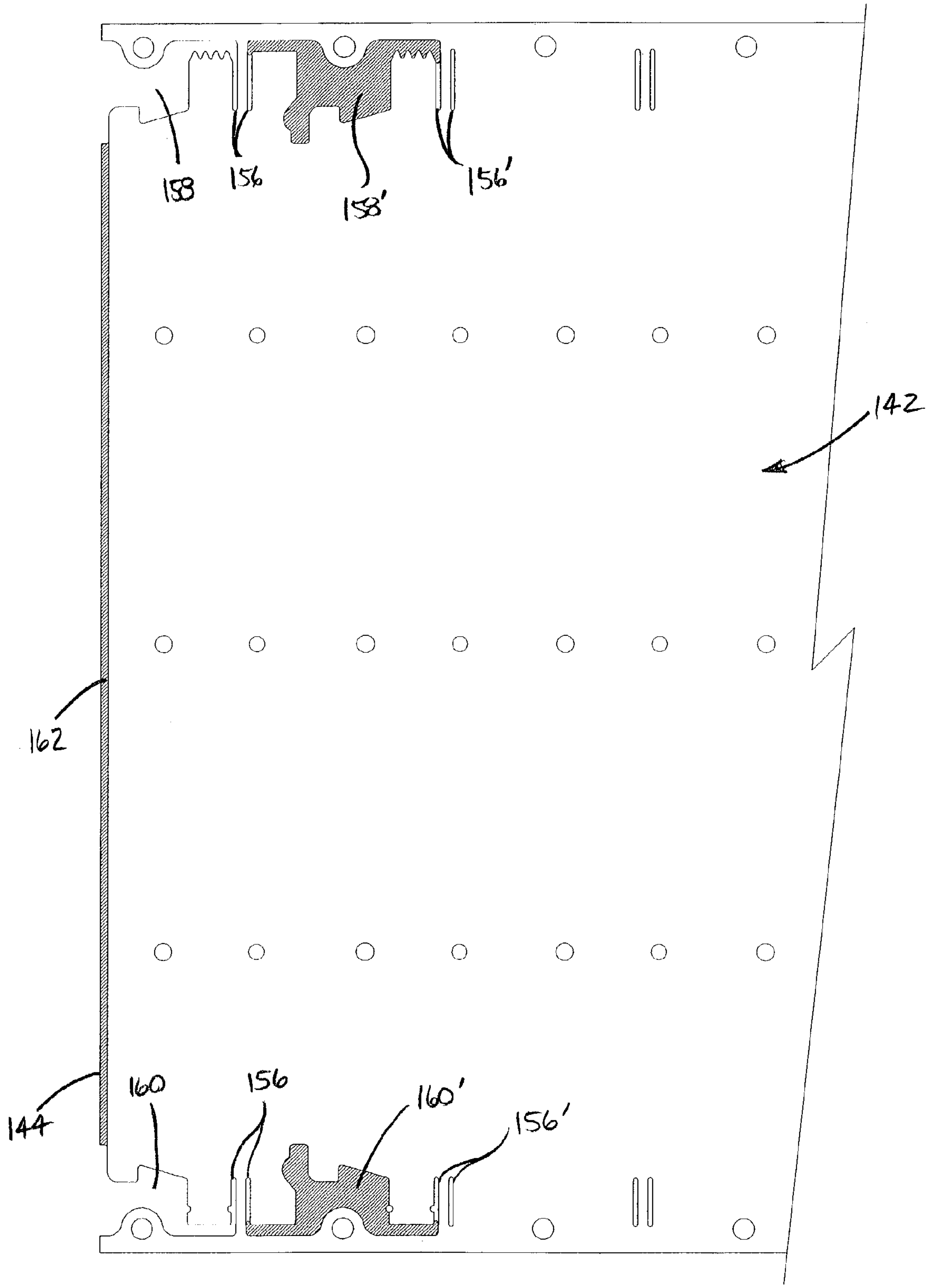
FIG. 6 is a top plan view of the sheet of metal shown in FIG. 5 illustrating another step in forming the stamped gate bar shown in FIG. 1.
Figure 7:
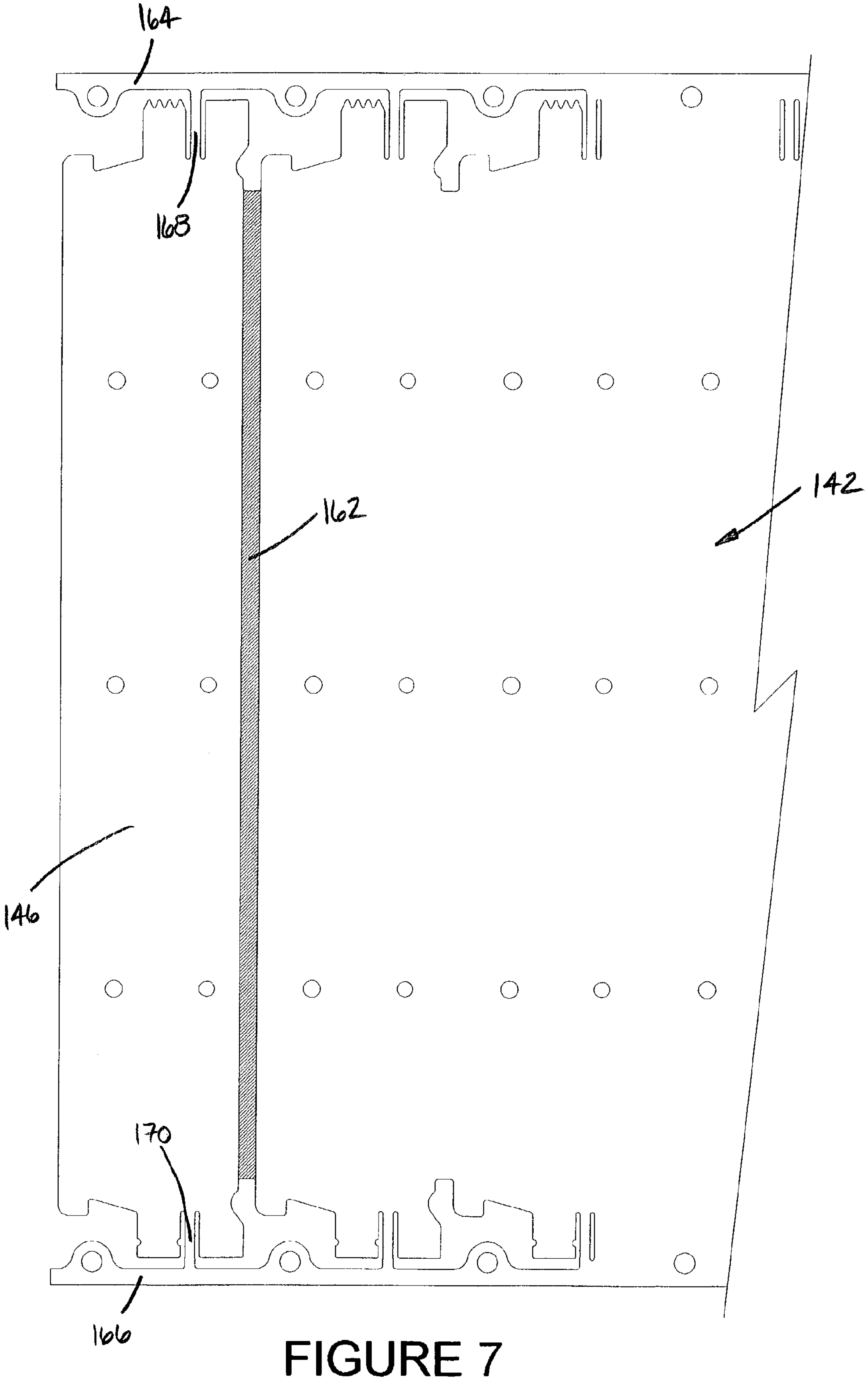
FIG. 7 is a top plan view of the sheet of metal shown in FIG. 6 further illustrating the step shown in FIG. 6 in forming the stamped gate bar shown in FIG. 1.

Turning now to FIGS. 6 and 7, it will be appreciated that the drawings and discussion thereof will refer to steps substantially completing the formation of gate bar blank 146, and that the series of blanks will be progressively formed and moved through the die arrangement without further reference to primes (') and double primes ("), except where specifically appropriate to differentiate relative positions of a feature. It will be further appreciated that the primed and double primed features and areas are so labeled, both hereinbefore and hereinafter, solely to indicate relative position to one another and should not be construed in any way limiting, altering or otherwise differentiating these features and areas.

FIG. 6 illustrates areas 158' and 160' being removed from sheet 142. It will be appreciated that the areas fully extend between slot areas 156 and 156'. It will be further appreciated that areas 158 and 160 shown in FIG. 5 do not indicate such a full extension due to the position of leading edge 144. In another step, area 162 is removed from along leading edge 144 as shown in FIG. 6.

FIG. 7 illustrates the operation shown in FIG. 6 with the sheet of material advanced by one step or by one station of a die set. In FIG. 7, area 162 is removed from the sheet of material forming gate bar blank 146. It will be appreciated that blank 146 remains secured to edges 164 and 166 of sheet 142 by lands 168 and 170, respectively.

Figure 8:
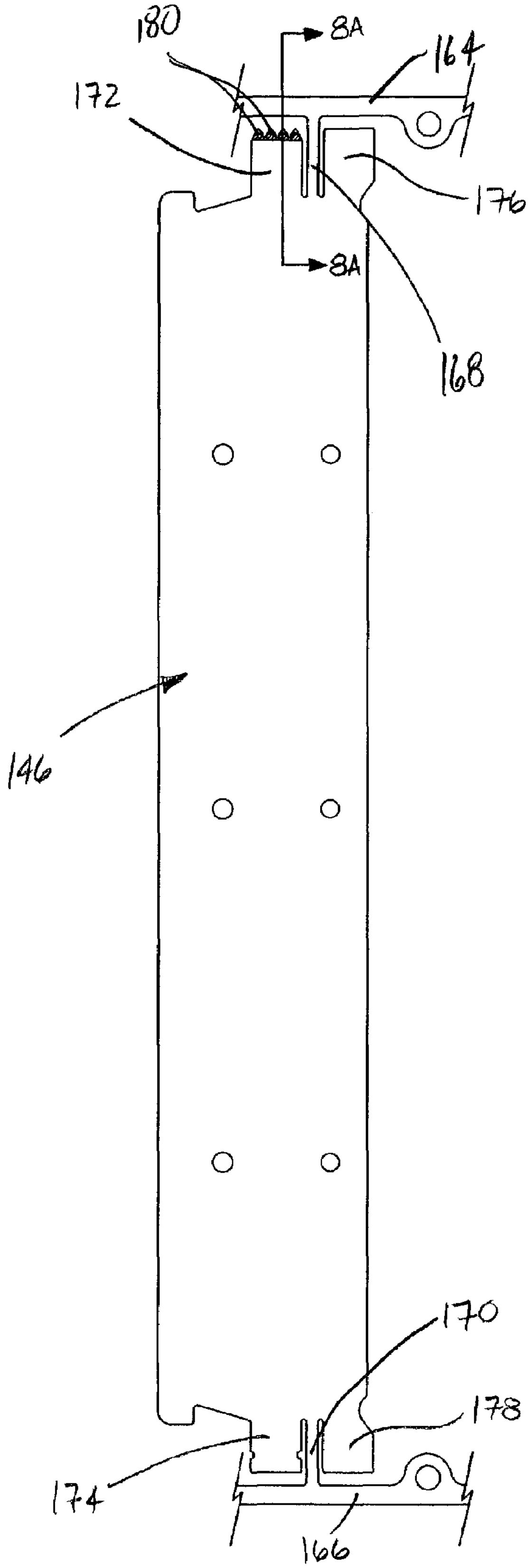
FIG. 8 is a top plan view of a portion of the sheet of metal shown in FIG. 7 illustrating another step in forming the stamped gate bar shown in FIG. 1.
Figure 8A:
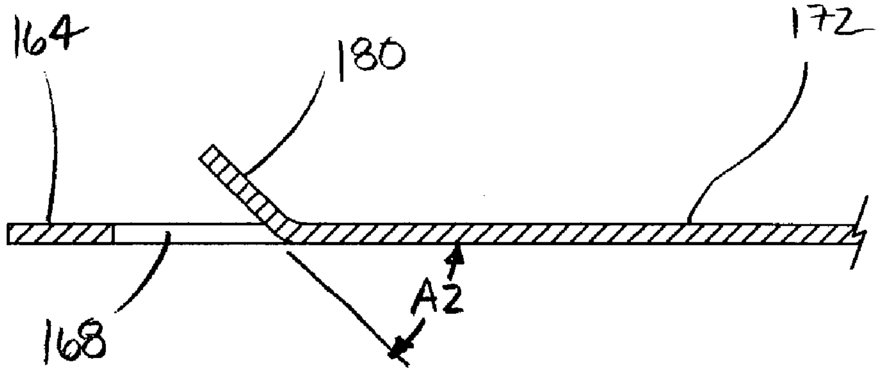
FIG. 8A is a side elevation view, shown in cross section, of the portion of the sheet of metal shown in FIG. 8 taken along line 8A—8A.

FIG. 8 illustrates gate bar blank 146 supported between edges 164 and 166 by lands 168 and 170, respectively. Gate bar blank 146 includes support member portions 172 and 174, and actuation member portions 176 and 178. It will be appreciated that gate bar blank 146 is ultimately formed in to gate bar 100, and that portions 172, 174, 176 and 178 are respectively formed into members 130, 132, 134 and 136. In another step, shown in FIG. 8, areas 180 on support member portion 172 are formed or displaced out of the plane of blank 146, as shown in FIG. 8A. Areas 180 are shown in FIG. 8A as being preferably formed upwardly at an angle A2. It will be appreciated that the areas can be formed at any suitable angle upward or downward without departing from the principles of the present invention.

Figure 9:
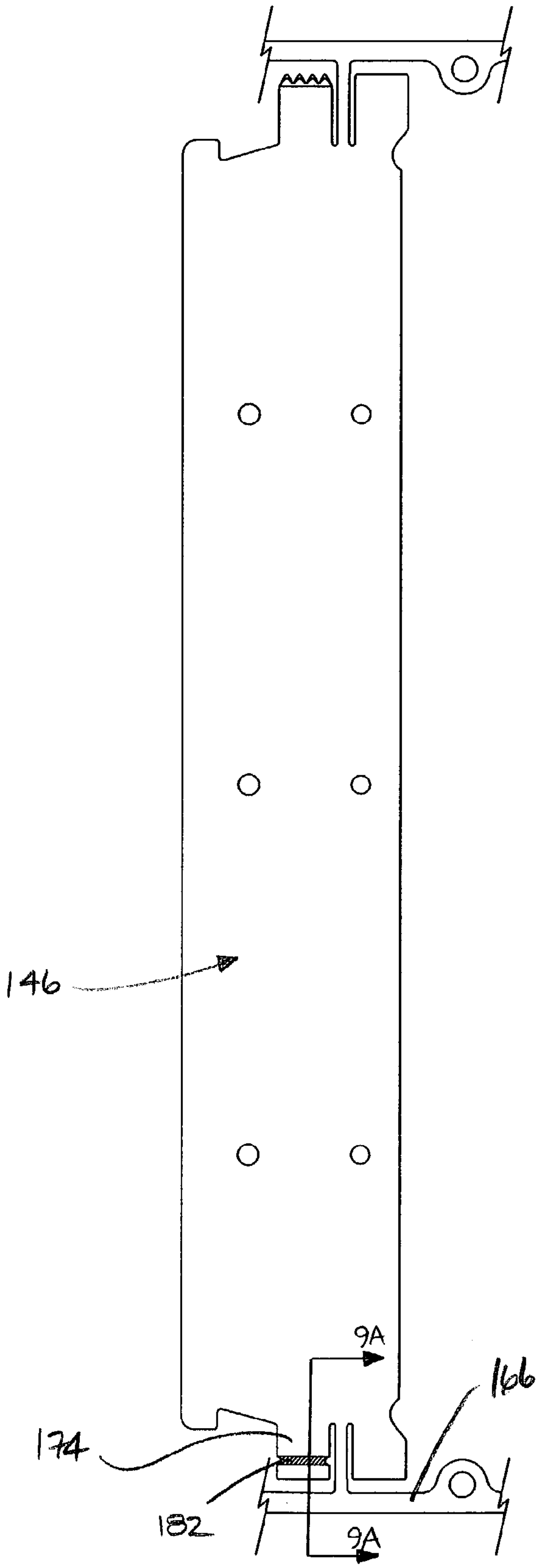
FIG. 9 is a top plan view of the portion of the sheet of metal shown in FIG. 8 illustrating another step in forming the stamped gate bar shown in FIG. 1.
Figure 9A:
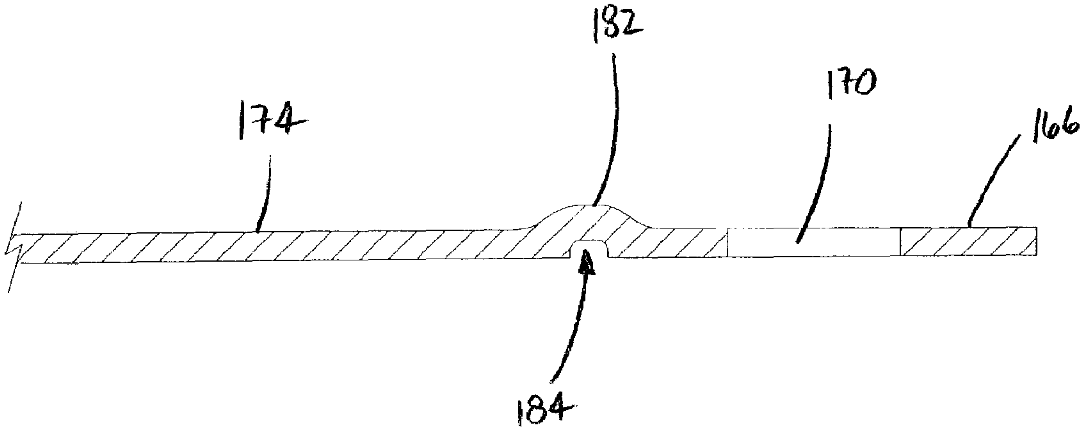
FIG. 9A is a side elevation view, shown in cross section, of the portion of the sheet of metal shown in FIG. 9 taken along line 9A—9A.

At another step, shown in FIG. 9, area 182 on support member portion 174 is coined or otherwise formed to create a slot 184, as shown in FIG. 9A. The slot ultimately forms snap ring groove 140, which can have specific dimensional requirements. As such, slot 184 and/or groove 140 may, in some cases, be re-struck to meet such dimensional requirements. Additionally, it will be appreciated that other suitable retaining features can be provided and/or used, as desired, without departing from the principles of the present invention.

Figure 10:
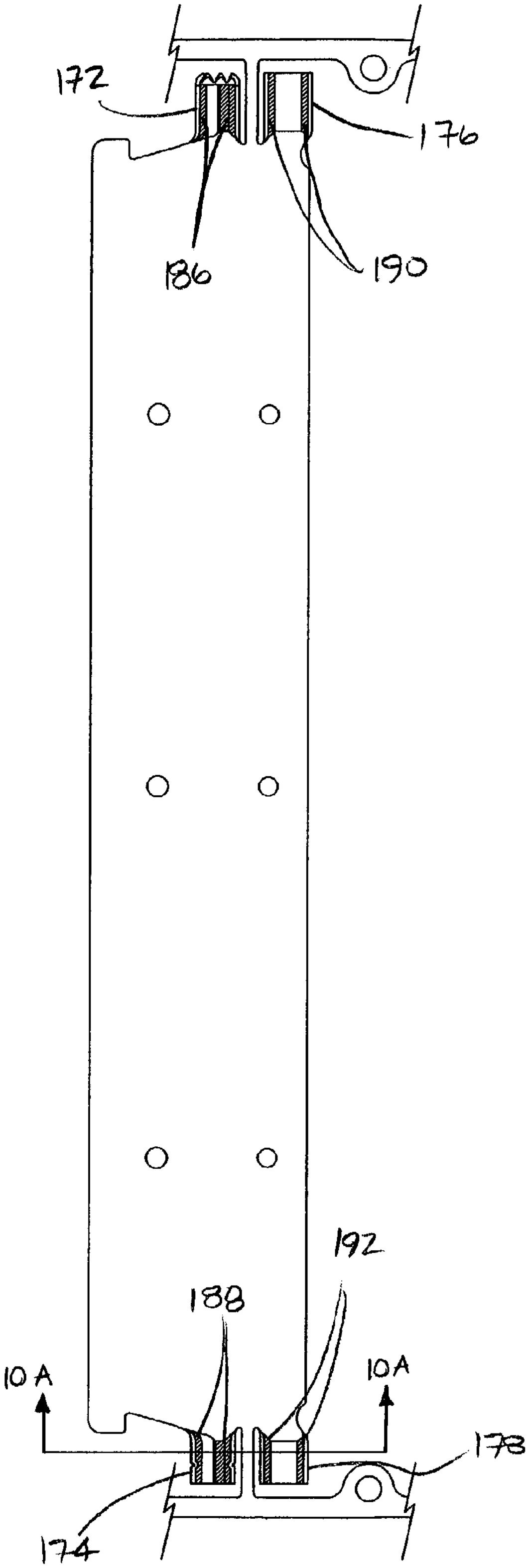
FIG. 10 is a top plan view of the portion of the sheet of metal shown in FIG. 9 illustrating another step in forming the stamped gate bar shown in FIG. 1.
Figure 10A:
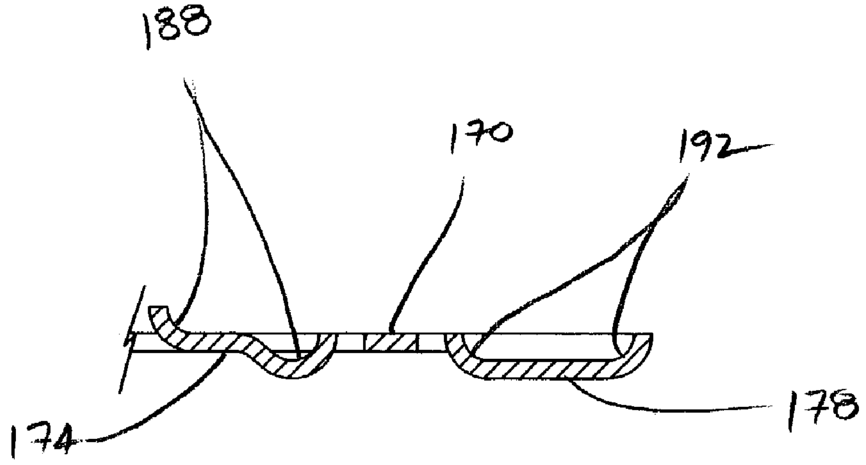
FIG. 10A is a side elevation view, shown in cross section, of the portion of the sheet of metal shown in FIG. 10 taken along line 10A—10A.

As shown in FIGS. 10 and 10A, areas 186, 188, 190 and 192 respectively of portions 170, 174, 176 and 178 are formed at this stage. It will be appreciated, however, that these areas could be formed in two or more separate steps if desired.

Figure 11:
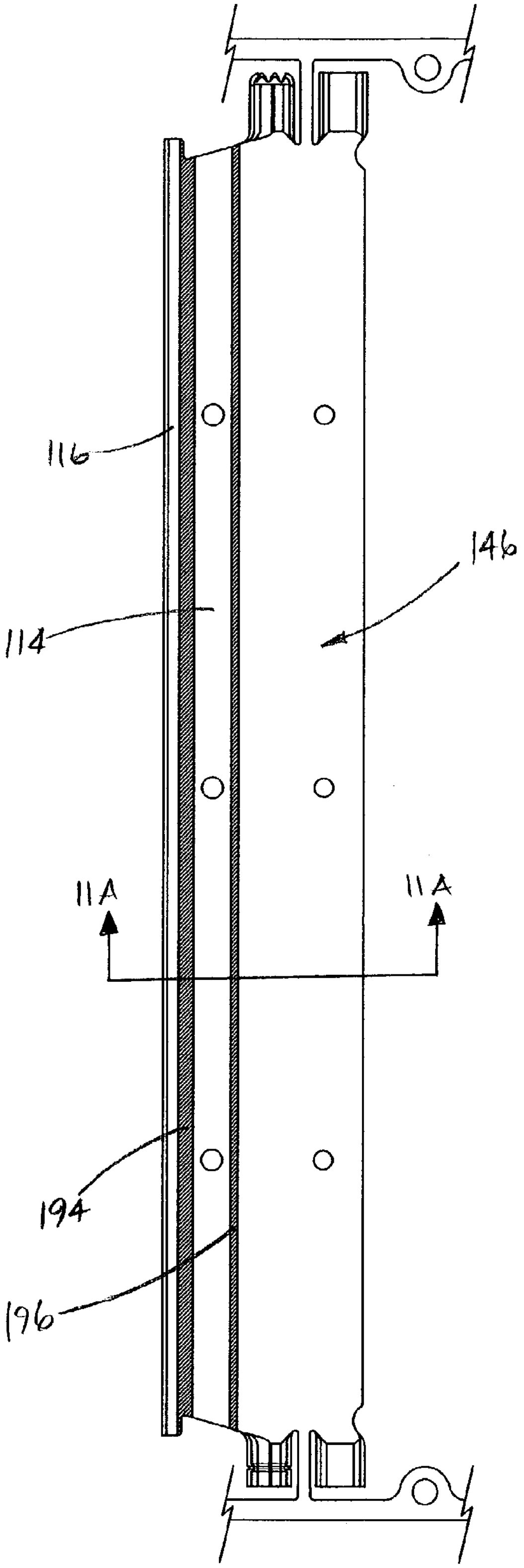
FIG. 11 is a top plan view of the portion of the sheet of metal shown in FIG. 10 illustrating another step in forming the stamped gate bar in FIG. 1.
Figure 11A:
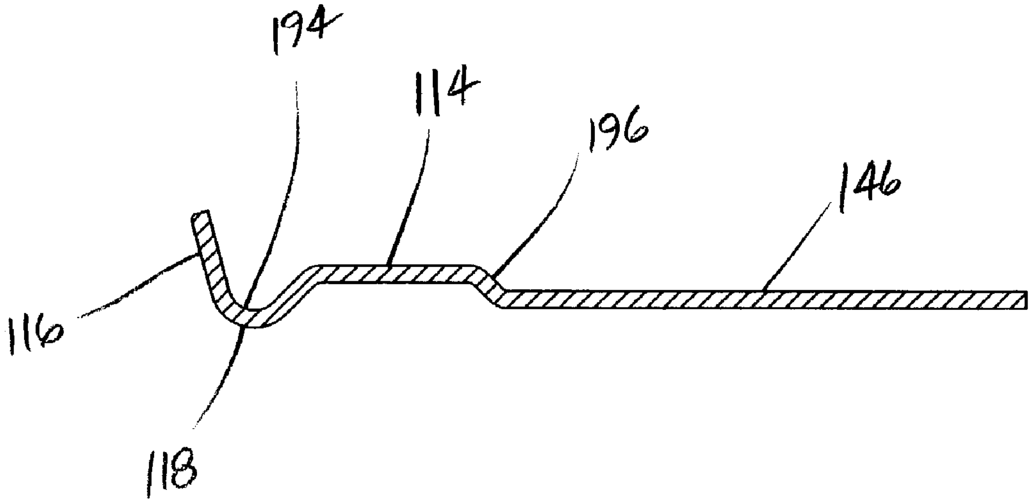
FIG. 11A is a side elevation view, shown in cross section, of the portion of the sheet of metal shown in FIG. 11 taken along line 11A—11A.
Figure 12:
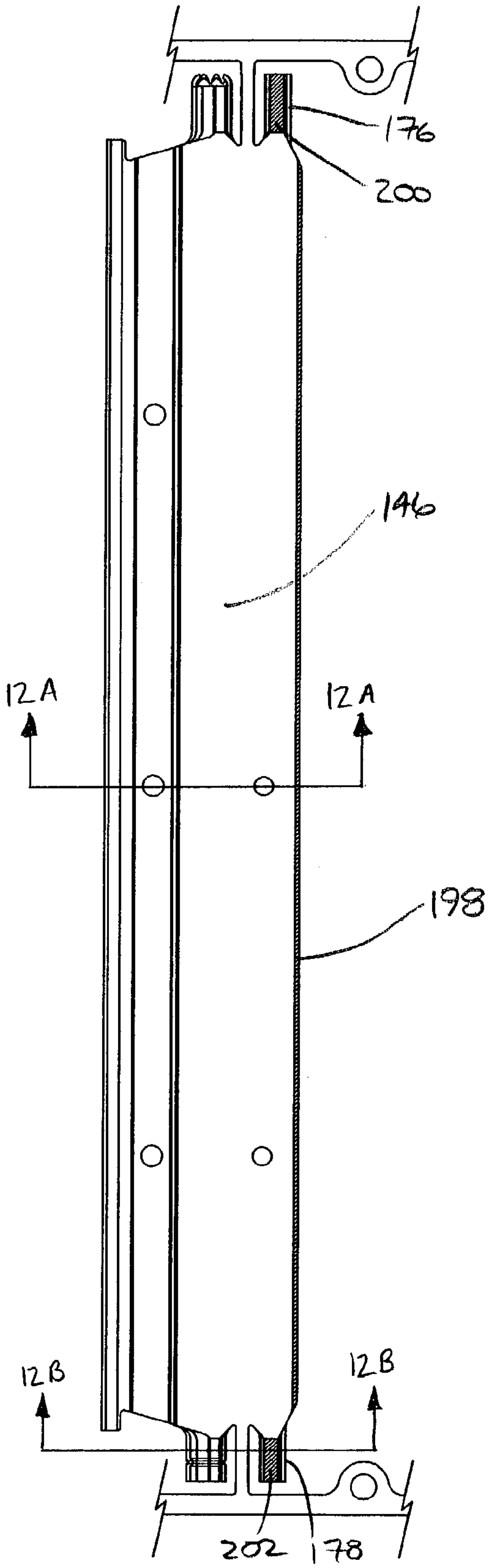
FIG. 12 is a top plan view of the portion of the sheet of metal shown in FIG. 11 illustrating another step in forming the stamped gate bar shown in FIG. 1.
Figure 12A:
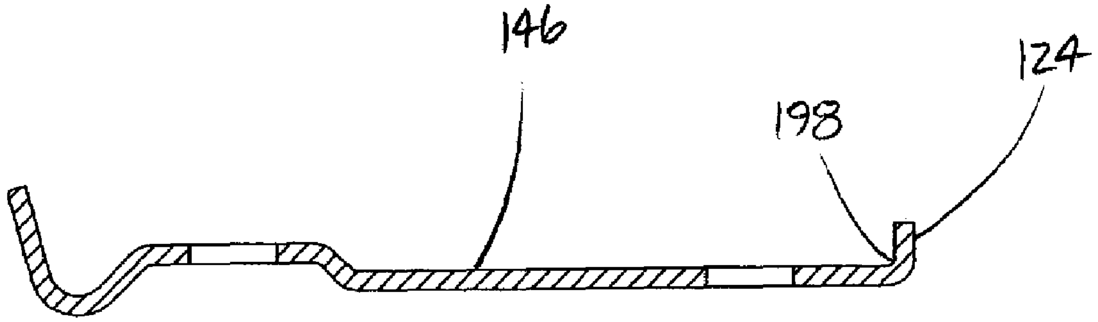
FIG. 12A is a side elevation view, shown in cross section, of the portion of the sheet of metal shown in FIG. 12 taken along line 12A—12A.
Figure 12B:
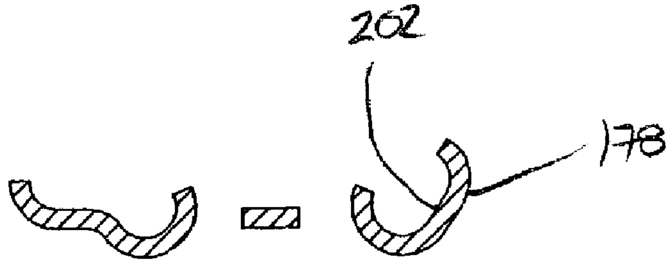
FIG. 12B is a side elevation view, shown in cross section, of the portion of the sheet of metal shown in FIG. 12 taken along line 12B—12B.
Figure 13:
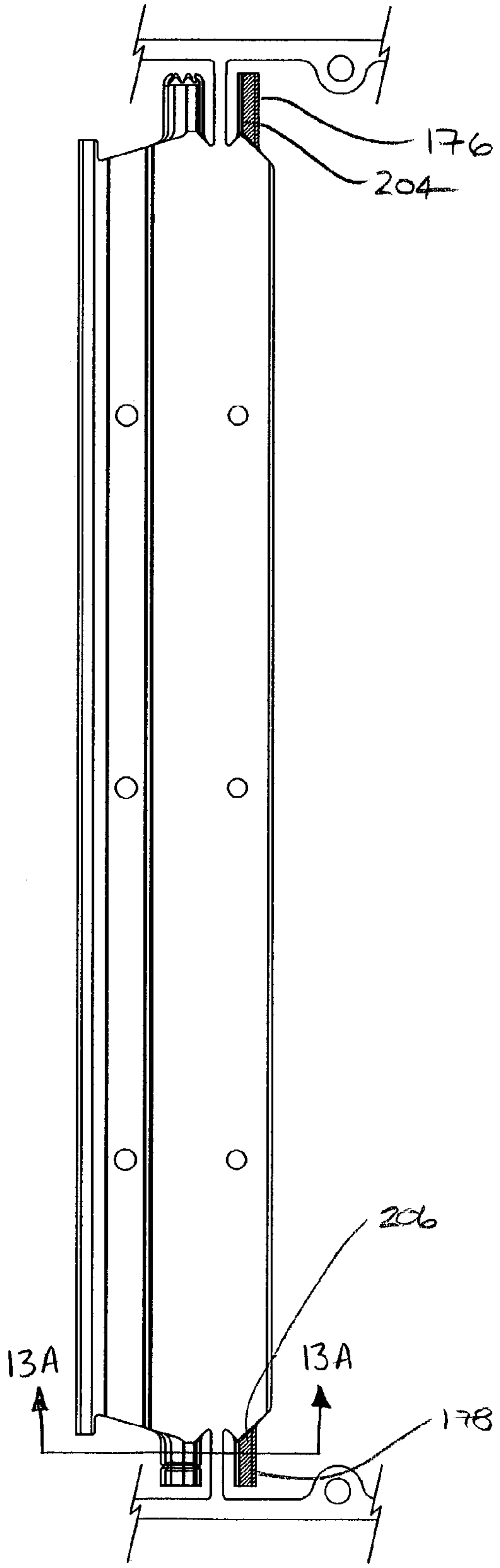
FIG. 13 is a top plan view of the portion of the sheet of metal shown in FIG. 12 illustrating another step in forming the stamped gate bar shown in FIG. 1.
Figure 13A:
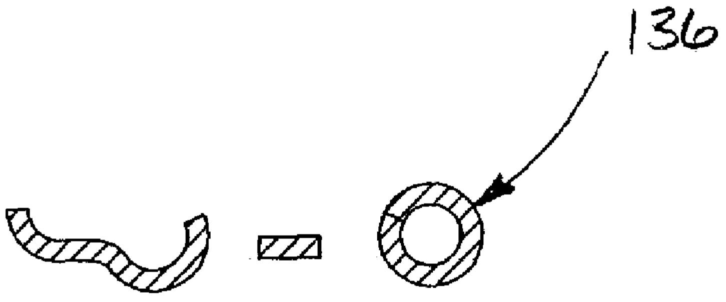
FIG. 13A is a side elevation view, shown in cross section, of the portion of the sheet of metal shown in FIG. 13 taken along line 13A—13A.

As shown in FIGS. 11 and 11A, blank 146 is deformed along areas 194 and 196 defining, at least in part, offset portion 114, vending portion 116 and curvilinear portion 118 of first side wall 108. In another step shown in FIGS. 12, 12A and 12B, area 198 extending longitudinally along blank 146 is formed at least partially defining end wall portion 124 as shown in FIG. 12A. Additionally, areas 200 and 202 respectively of actuation member portions 176 and 178 are further formed during this step, as shown in FIG. 12B. FIG. 13 shows another step further forming areas 204 and 206, respectively of actuation member portions 176 and 178, substantially into generally cylindrical actuation members 134 and 136, as shown in FIG. 13A.

Figure 14:
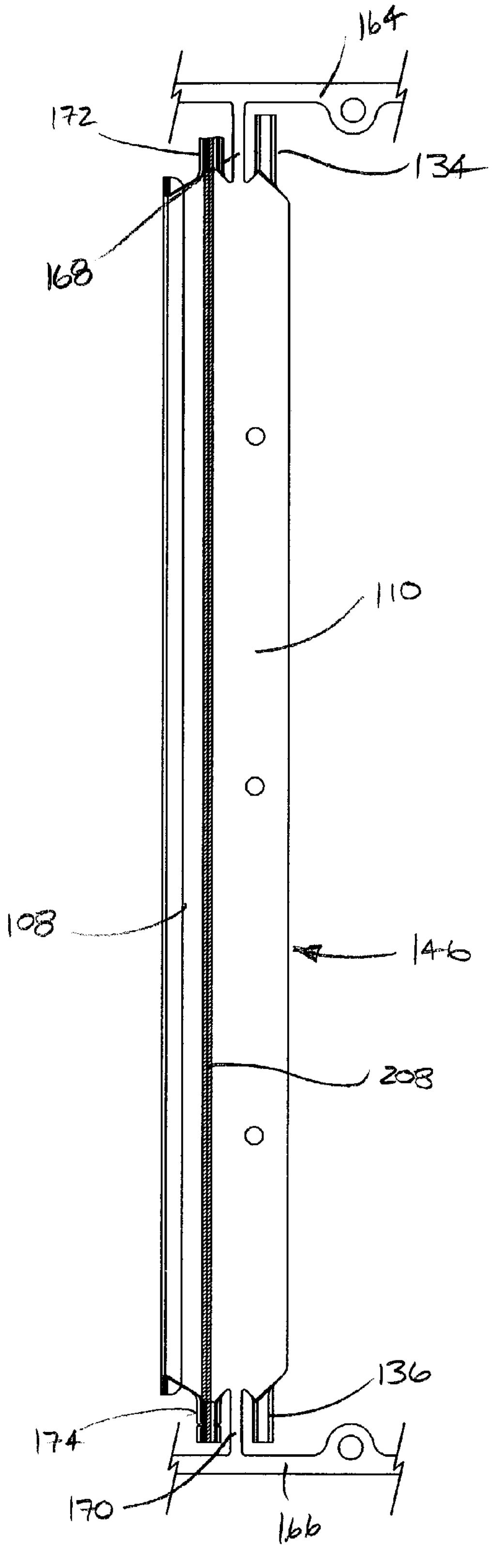
FIG. 14 is a top plan view of the portion of the sheet of metal shown in FIG. 13 illustrating another step in forming the stamped gate bar shown in FIG. 1.
Figure 14A:
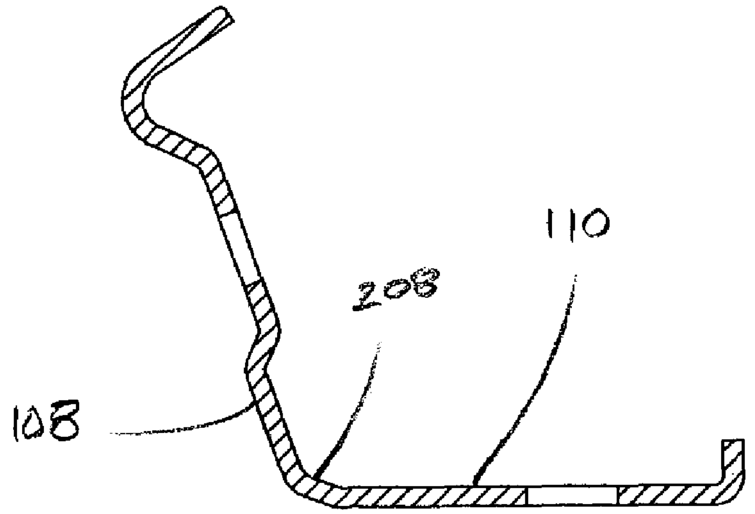
FIG. 14A is a side elevation view, shown in cross section, of the portion of the sheet of metal shown in FIG. 12A illustrating another step in forming the stamped gate bar shown in FIG. 1.
Figure 14B:
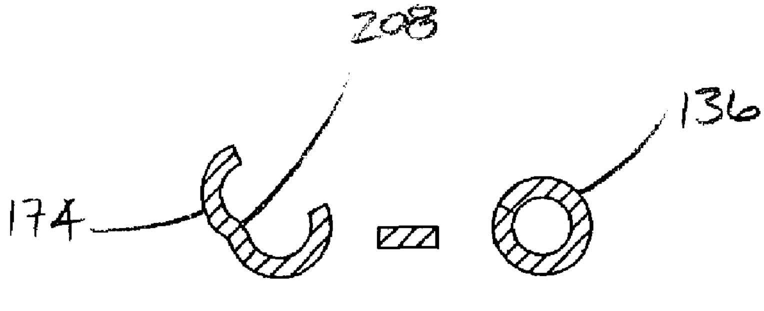
FIG. 14B is a side elevation view, shown in cross section, of the portion of the sheet of metal shown in FIG. 13A illustrating another step in forming the stamped gate bar shown in FIG. 1.

In another step, area 208 shown in FIGS. 14, 14A and 14B is bent or otherwise formed at least partially defining first side wall 108 and second side wall 110. It will be appreciated that area 208 extends along both support member areas 172 and 174. As such, the same are also at least partially formed during this step.

Figure 15A:
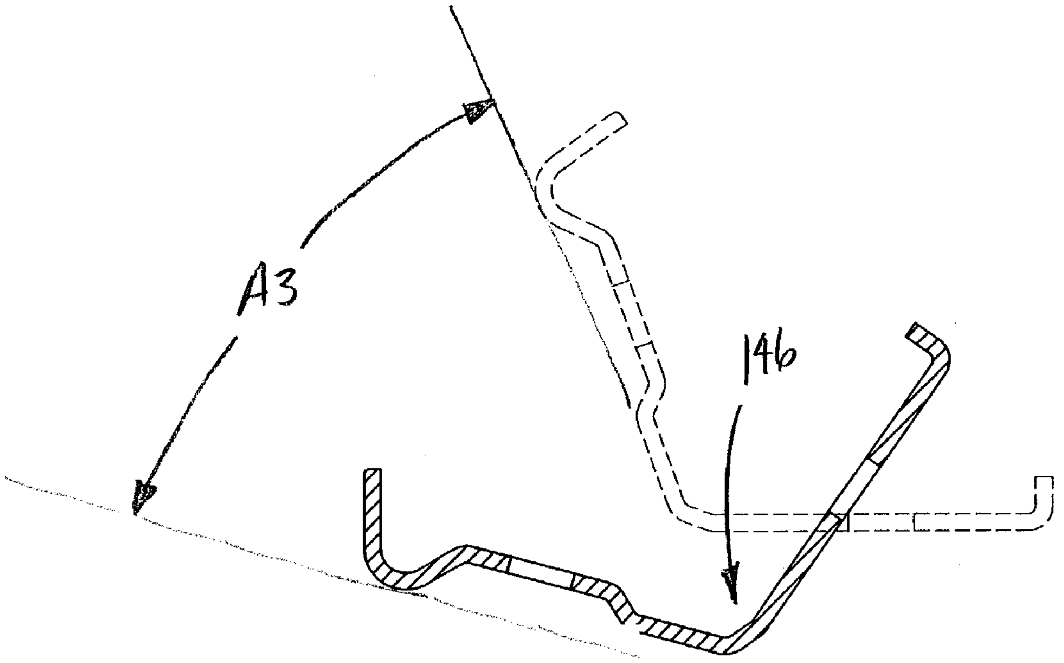
FIG. 15A is a side elevation view, shown in cross section, of the portion of the sheet of metal shown in FIG. 14A illustrating another step in forming the stamped gate bar shown in FIG. 1.
Figure 15B:
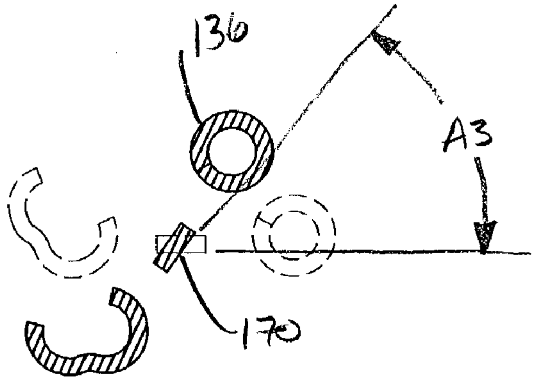
FIG. 15B is a side elevation view, shown in cross section, of the portion of the sheet of metal shown in FIG. 14B illustrating another step in forming the stamped gate bar shown in FIG. 1.

At this stage, gate bar blank 146 is rotated to reposition the same for further forming operations. As shown in FIGS. 15A and 15B, blank 146 is rotated through an angle A3. It will be appreciated that angle A3 can be any suitable angle without limitation. It will be further appreciated that lands 168 and 170 (FIG. 14) will preferably twist a suitable amount such that edges 164 and 166 (FIG. 14) remain substantially planar with the upstream portions of the sheet of material.

Figure 16A:
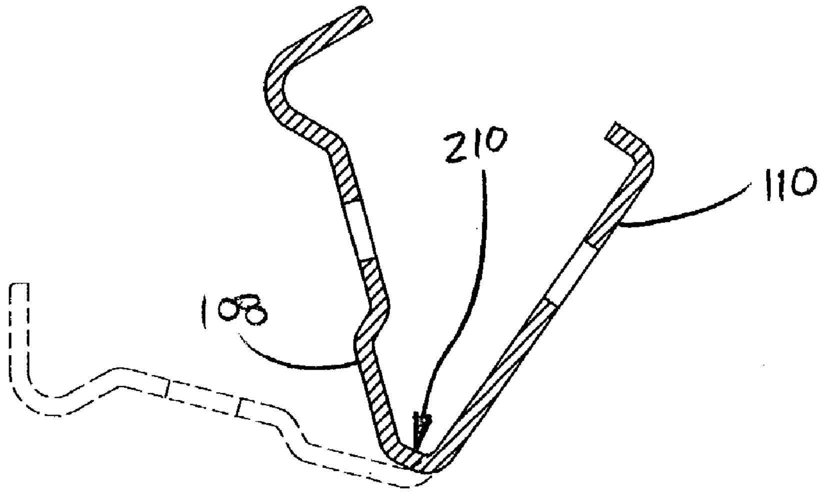
FIG. 16A is a side elevation view, shown in cross section, of the portion of the sheet of metal shown in FIG. 15A illustrating another step in forming the stamped gate bar shown in FIG. 1.
Figure 16B:
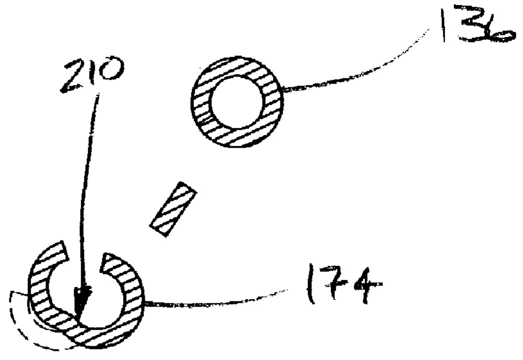
FIG. 16B is a side elevation view, shown in cross section, of the portion of the sheet of metal shown in FIG. 15B illustrating another step in forming the stamped gate bar shown in FIG. 1.
Figure 17A:
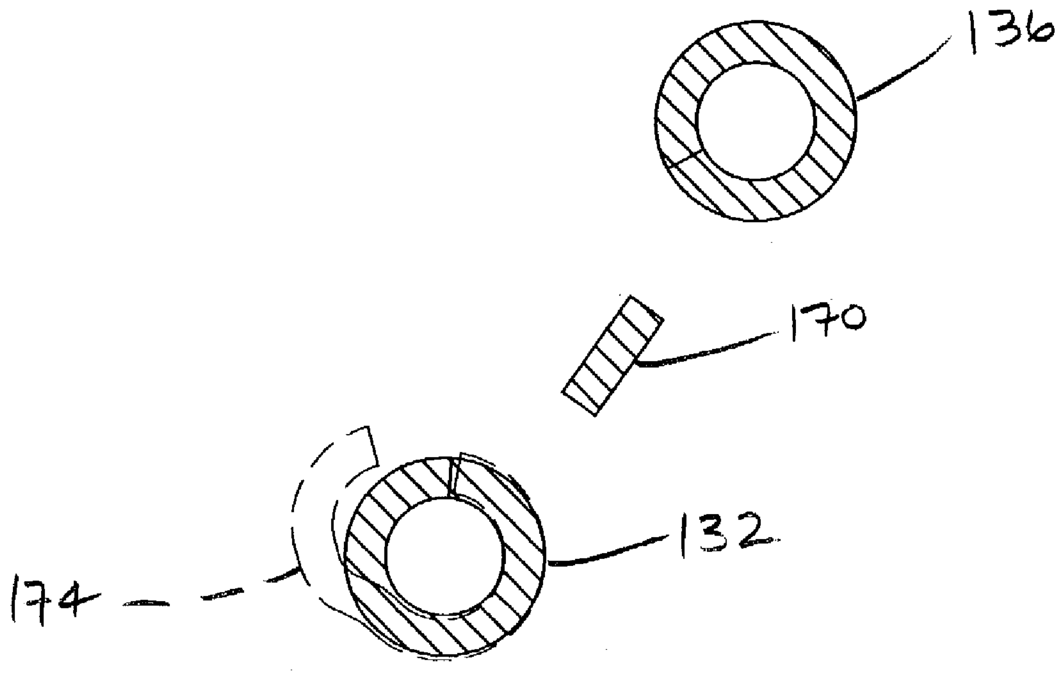
FIG. 17A is a side elevation view, shown in cross section, of the portion of the sheet of metal shown in FIG. 16B illustrating another step in forming the stamped gate bar shown in FIG. 1.
Figure 18A:
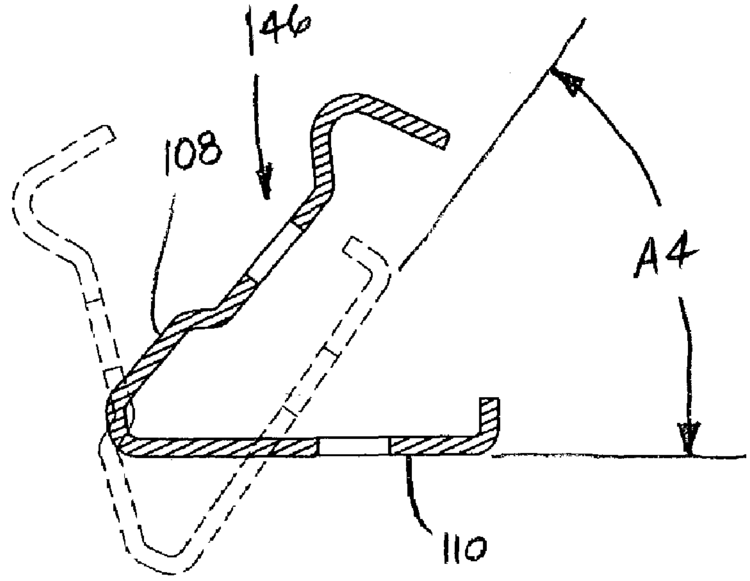
FIG. 18A is a side elevation view, shown in cross section, of the portion of the sheet of metal shown in FIG. 16A illustrating another step in forming the stamped gate bar shown in FIG. 1.
Figure 18B:
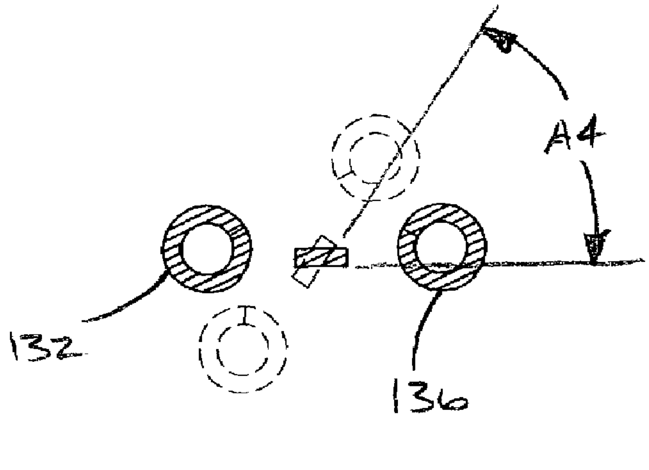
FIG. 18B is a side elevation view, shown in cross section, of the portion of the sheet of metal shown in FIG. 17A illustrating another step in forming the stamped gate bar shown in FIG. 1.

In another step, shown in FIGS. 16A and 16B, areas 210 are further formed in a manner similar to that of areas 208 shown in FIGS. 14, 14A and 14B to further close side walls 108 and 110 toward one another and to further form support members portions 172 and 174 as shown in FIG. 16B, for example. In another step, as shown in FIG. 17A, support member portion 172 is formed into support member 130. Preferably, support member portion 174 (not shown in FIG. 17A) is simultaneously formed into support member 132 (not shown in FIG. 17A). In a further step, blank 146 is rotated through an angle A4 as shown in FIGS. 18A and 18B. In one embodiment, angles A3, shown in FIGS. 15A and 15B, will be substantially equal such that second side wall 110 is substantially planar with the edges of the sheet of material. It will be appreciated, however, that any suitable angle can be used and that side wall 110 can be positioned at a non-zero angle relative to edges 164 and 166, if desired.

Figure 19:
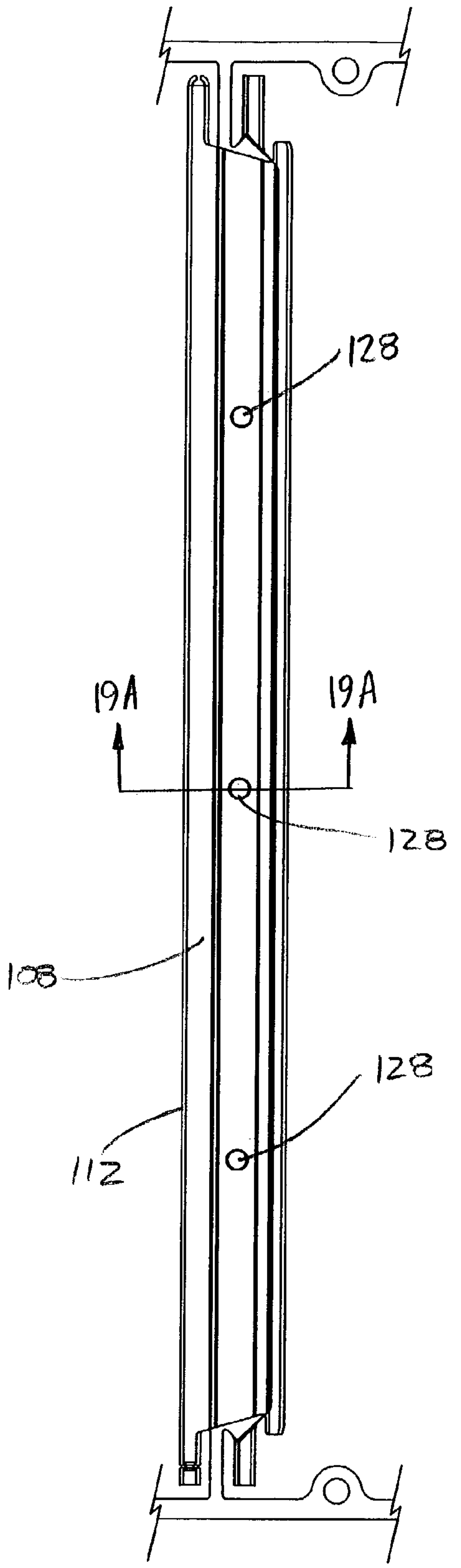
FIG. 19 is a top plan view of the portion of the sheet of metal shown in FIG. 14 after undergoing the steps illustrated in FIGS. 15A, 15B, 16A, 16B, 17A, 18A and 18B, and illustrating another step in forming the stamped gate bar shown in FIG. 1.
Figure 19A:
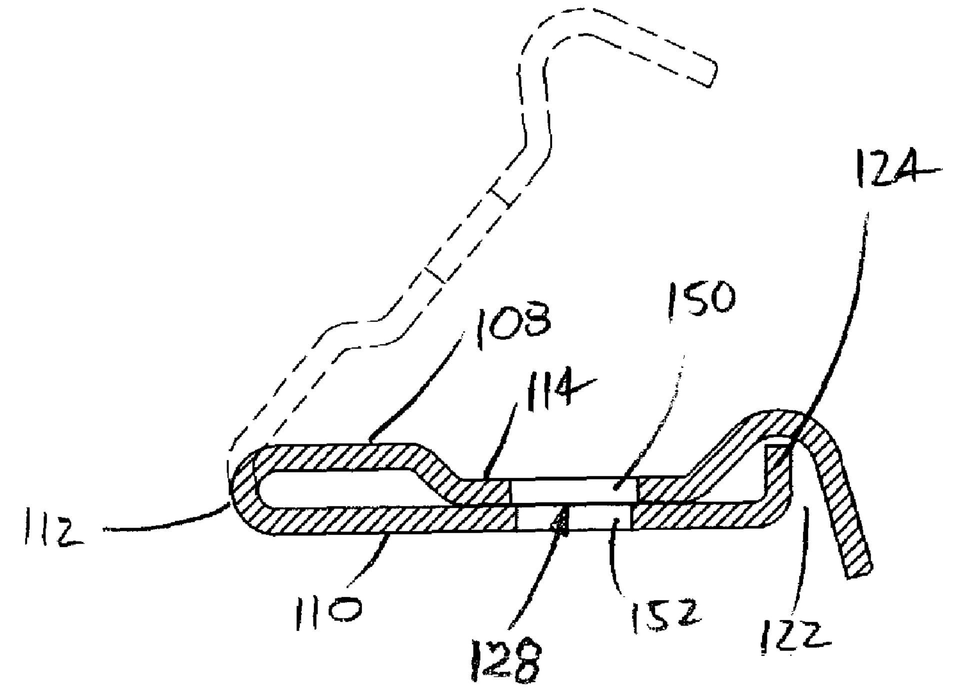
FIG. 19A is a side elevation view, shown in cross section, of the portion of the sheet of metal shown in FIG. 19 taken along line 19A—19A.

Side walls 108 and 110 are further formed in another step such that edge wall 112 is substantially formed, as shown in FIGS. 19 and 19A. As such, it will be appreciated that elongated body 102 is substantially formed at this stage. Additionally, it will be appreciated that offset portion 114 is shown in FIG. 19A as being in abutting engagement with side wall 110. And, end wall portion 124 is received in channel 122. Furthermore, it will be appreciated from FIG. 19A that holes 150 and 152 substantially align with one another forming passages 128 shown in FIG. 19.

Figure 20:
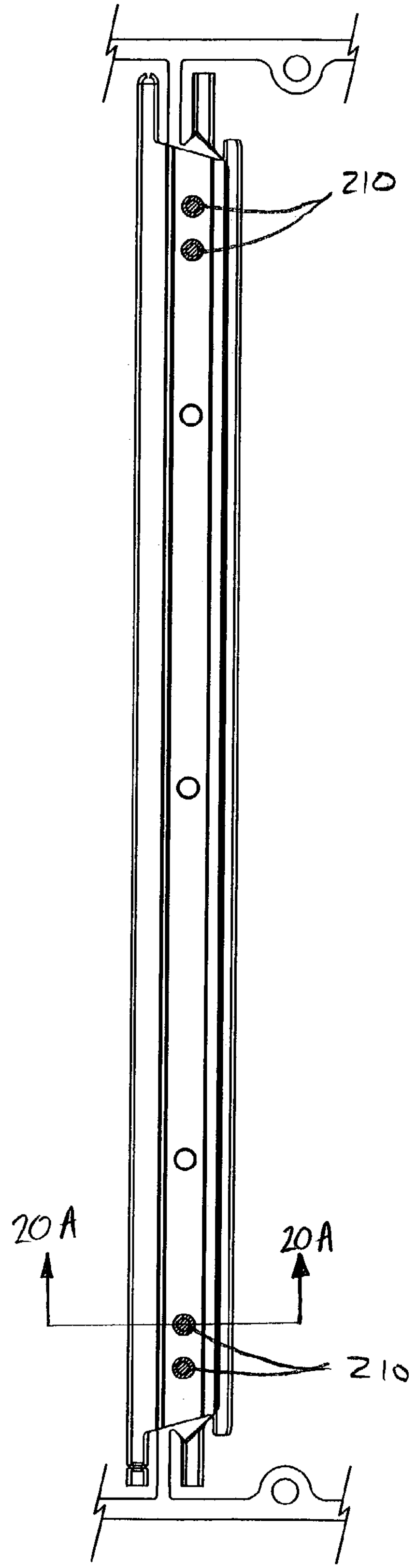
FIG. 20 is a top plan view of the portion of the sheet of metal shown in FIG. 19 illustrating another step in forming the stamped gate bar shown in FIG. 1.
Figure 20A:
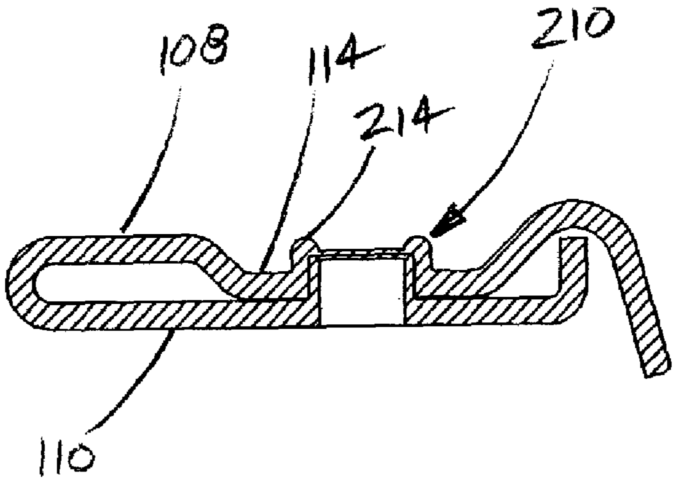
FIG. 20A is a side elevation view, shown in cross section, of the portion of the sheet of metal shown in FIG. 20 taken along line 20A—20A.
Figure 21:
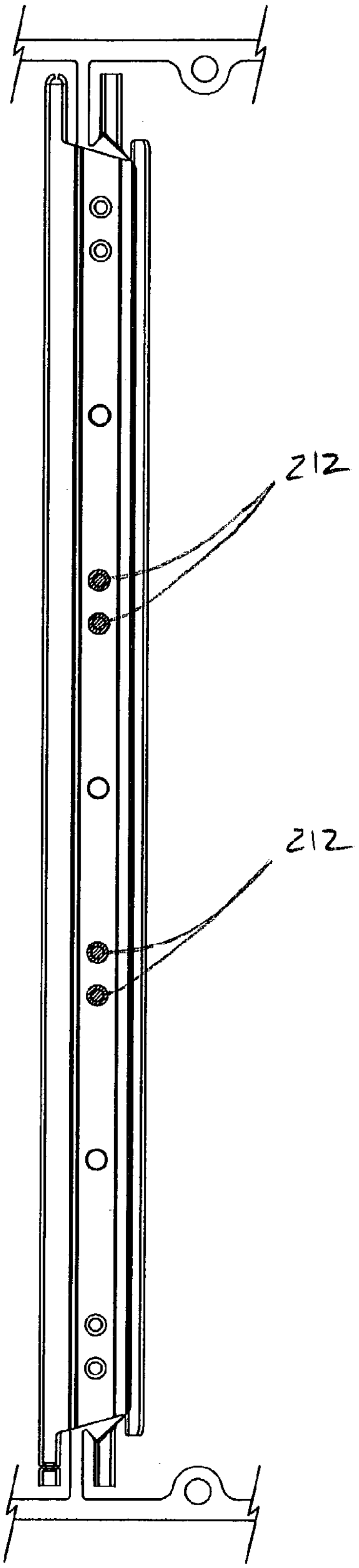
FIG. 21 is a top plan view of the portion of the sheet of metal shown in FIG. 20 illustrating another step in forming the stamped gate bar shown in FIG. 1.
Figure 22:
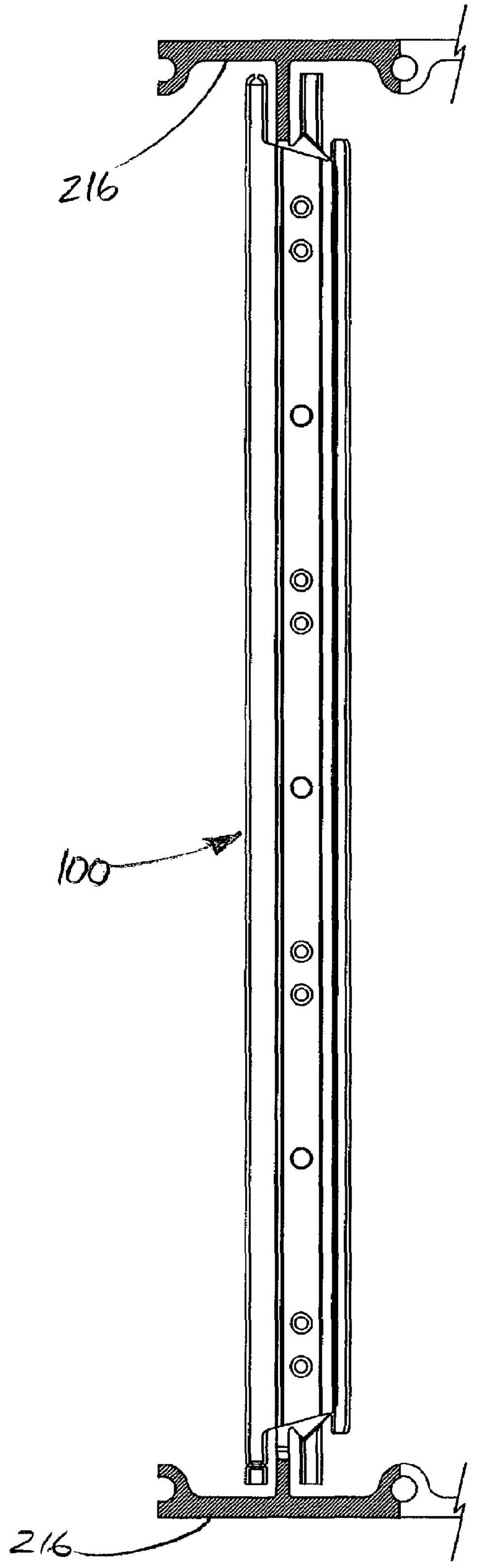
FIG. 22 is a top plan view of the portion of the sheet of metal shown in FIG. 21 illustrating another step in forming the stamped gate bar shown in FIG. 1.

In other steps, such as those shown in FIGS. 20, 20A and 21, TOX joints are formed in areas 210 and 212. The TOX joints each form a boss 214 as shown in FIG. 20A. It will be appreciated that upset-pressing type fasteners are well known to those skilled in the art, and as such, the further discussion thereof is not provided. It will be further appreciated that TOX joints 126, shown in FIGS. 20 and 21, can be formed in any suitable number, pattern, size and/or configuration without departing from the principles of the present invention. As shown in FIG. 22, areas 216 are removed from elongated body 102. This substantially forms gate bar 100 such that a finished part is thereafter ejected from the die. It will be appreciated that any of the various features can be re-struck as desired to suitably form the part to finished dimensions.

While the invention has been described with reference to the preferred embodiments and considerable emphasis has been placed herein on the structures and structural interrelationships between the component parts of the embodiments disclosed, it will be appreciated that other embodiments of the invention can be made and that many changes can be made in the embodiments illustrated and described without departing from the principles of the invention. For example, the distinct steps and order of steps may be slightly altered or consideration given to combining or separating selected forming steps without departing from the present invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. As such, it is intended that the invention be construed as including all such modifications and alterations insofar as they come within the scope of the appended claims and the equivalents thereof.

The invention claimed is:

1. A method of forming a gate bar from a sheet of metal for use on an associated vending machine, said method comprising the steps of:

forming a blank on said sheet of metal, said blank including an elongated body having a first side wall, a second side wall and an intermediate wall disposed therebetween;

forming said intermediate wall such that at least a part of each of said first and second side walls are adjacent one another; and, attaching said adjacent parts of said first and second side walls together.

2. The method of claim 1, wherein said step of attaching said adjacent parts includes forming an upset-pressing type fastener.

3. The method of claim 1, wherein said step of forming said intermediate wall includes forming at least a part of said first and second side walls into substantially parallel alignment with one another.

4. The method of claim 1, wherein said blank has opposing ends and includes a support member portion extending from one of said opposing ends, said method further comprising a step of forming said support member portion into a support member for supporting said elongated body on the associated vending machine.

5. The method of claim 1, wherein said blank has opposing ends and includes an actuator member portion extending from one of said opposing ends, said method further comprising a step of forming said actuator member portion into an actuator member for operatively engaging an associated actuator of the associated vending machine.

6. A method according to claim 1, wherein forming said blank includes removing a first material portion from said sheet material to form an elongated edge of said gate bar blank.

7. A method according to claim 1, wherein forming said blank includes removing a first material portion from said sheet material to form an end of said blank.

8. A method according to claim 1, wherein forming said blank includes forming an offset portion along said first side wall.

9. A method according to claim 8, wherein said blank has a top surface and a bottom surface and forming said offset portion includes displacing a portion of said first side wall from said bottom surface toward said top surface.

10. A method according to claim 8, wherein forming said intermediate wall includes deforming said intermediate wall until said offset portion of said first side wall is adjacent said second side wall.

11. A method according to claim 10, wherein attaching said adjacent parts includes securing said offset portion of said first side wall in abutting engagement with said second side wall.

12. A method according to claim 1, wherein forming said intermediate wall includes deforming said intermediate wall until said first side wall and said second side wall are approximately parallel with one another.

13. A method according to claim 1, wherein said blank includes a support member portion disposed along one of said opposing ends, and said method further comprises forming said support member portion into an approximately cylindrical support pin.

14. A method according to claim 1, wherein said blank includes an actuator member portion disposed along one of said opposing ends, and said method further comprises forming said actuator member portion into an actuator member.

15. A method according to claim 1, wherein said sheet of metal includes opposing outer edge portions and said blank is formed between said outer edge portions, said method further comprising detaching said blank from said outer edge portions.

16. A method according to claim 15, wherein said blank includes opposing outer ends respectively connected to said opposing outer edge portions of said sheet of metal by integrally formed connector strips, and detaching said blank includes severing said connector strips.

17. A method according to claim 15, wherein forming said blank includes removing spaced first and second material portions from said sheet material adjacent said outer edge portions to form said opposing outer ends.

18. A method according to claim 17, wherein forming said blank includes removing spaced third and fourth material portions from said sheet material to form first and second elongated edges extending respectively along said first and second side walls.

19. A method according to claim 18 further comprising a step of deforming a portion of said first side wall adjacent said first elongated edge.

20. A method according to claim 19, wherein said step of deforming includes deforming said portion of said first side wall at an angle of from about 45 degrees to about 90 degrees relative to another portion of said first side wall.

* * * * *